Oct. 14, 1969　　　R. A. FRIGSTAD　　　3,472,730
HEAT-CURABLE FILAMENT-REINFORCED RESINOUS SHEETING
AND LAMINATING PROCESS USING SAME
Filed Dec. 28, 1967

INVENTOR.
ROBERT A. FRIGSTAD
BY
Carpenter, Kinney & Coulter
ATTORNEYS

United States Patent Office 3,472,730
Patented Oct. 14, 1969

3,472,730
HEAT-CURABLE FILAMENT-REINFORCED RESINOUS SHEETING AND LAMINATING PROCESS USING SAME
Robert A. Frigstad, White Bear Lake, Minn., assignor to Minnesota Mining and Manufacturing Company, St. Paul, Minn., a corporation of Delaware
Continuation-in-part of application Ser. No. 585,346, Oct. 10, 1966. This application Dec. 28, 1967, Ser. No. 701,520
Int. Cl. B32b 5/02, 27/12, 27/04
U.S. Cl. 161—144                    6 Claims

ABSTRACT OF THE DISCLOSURE

Filament-reinforced resinous sheeting that includes a separate exterior film on at least one side. This film comprises a heat-curable resin composition that includes (1) a high-strength heat-curable resin and (2) a modifying resin that increases the capability for elongation of the cured film composition.

---

Figure 1:
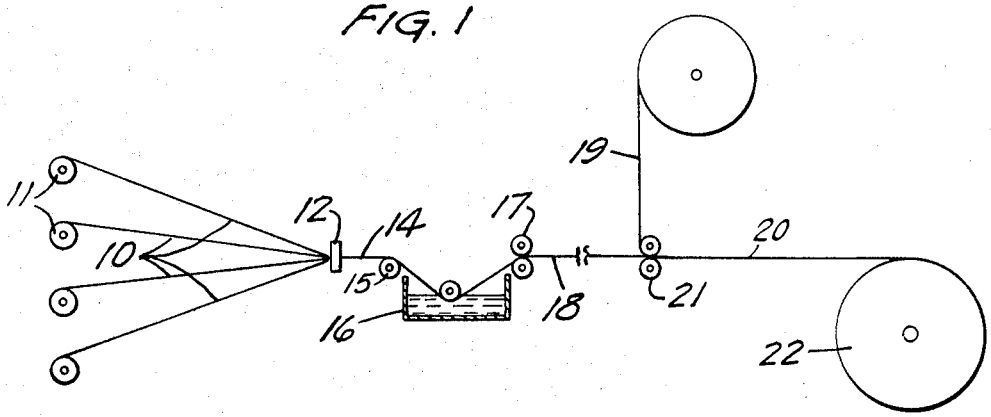

This application is a continuation-in-part of a pending application, Ser. No. 585,346, now abandoned which was filed Oct. 10, 1966 as a continuation-in-part of another pending application, Ser. No. 24,882, filed Apr. 27, 1960.

The high strength-to-weight ratio, corrosion-resistance, adaptability to ready formation in complex configurations, and other advantageous properties of articles and structural members laminated from filament-reinforced sheets of heat-curable resin compositions have resulted in many applications for such materials. Notwithstanding such rather large usage, however, the desire has existed for improvement in the interply or interlaminar strength of such laminated articles and structural members. While the strength of the laminated article has been high in the plane of the laminations, the article has been susceptible to those forces acting on it that tend to separate the laminations. For example, some structural members laminated from prior art filament-reinforced resinous sheets, such as the skin panels on helicopter blades, have shown a tendency over a period of time to delaminate when subjected to a great deal of flexural stress, thus shortening their useful life.

This invention provides filament-reinforced sheets from which articles are laminated that have greatly enlarged interply or interlaminar strength over that exhibited by articles laminated from prior art filaments-reinforced resinous sheeting. The filament-reinforced resinous sheeting of this invention includes a thin flexible layer of high-strength reinforcing filaments, preferably a layer of nonwoven collimated filaments, and a heat-curable resin composition coated onto the filaments. In addition, a separate exterior film about ½ to 4 mils in thickness is carried on at least one side of the layer of coated filaments. This film comprises a heat-curable resin composition that includes (1) a high-strength heat-curable resin and (2) a modifying resin that substantially increases the capability for elongation of the film resin composition when cured. The modifying resin, in general, is high in molecular weight and exhibits a substantial deformation when stressed beyond its yield point. The modifying resin comprises no more than 50 parts by weight of the combination of heat-curable and modifying resins in the film resin composition, and the total heat-curable composition in the sheeting comprises between about 35 and 65 volume percent of the sheeting.

Insofar as is known, the best interply strength before this invention of objects molded from filament-reinforced resinous sheets, as indicated by the climbing drum peel test (described later), was about 7–8 pounds per inch of width. By contrast, the interply peel strength of objects molded from preferred filament-reinforced sheets of this invention is at least twice as great. As a result, laminated structural members, such as the skin panel of helicopter blades, have a much longer life and can resist higher and lengthier applications of flexural stress.

In addition to better interlaminar strength, articles prepared from filament-reinforced resinous sheets of the invention exhibit good strength and toughness under different kinds of stress and also exhibit other desirable structural properties. For example, articles or structural members molded from preferred filament-reinforced resinous sheets of the invention reinforced with collimated filaments of glass, with the filaments in alternate plies extending in transverse directions (hereafter, called crossply laminated articles) exhibit at room temperature tensile, compressive, and flexural strengths of at least about 60,000, 60,000, and 80,000 pounds/square inch, and even higher. In addition, these bidirectional laminated objects exhibit at room temperature a modulus in flexure of no less than about 3,000,000 pounds/square inch. At elevated temperatures, such as 300–400° F., the properties of the articles laminated from preferred filament-reinforced sheets of this invention decrease only slightly. At such temperatures, these articles have tensile, compressive, and flexural strengths, for example, of at least about 40,000, 45,000, and 45,000 pounds/square inch, respectively, and a modulus in flexure of at least 2,500,000 pounds/square inch. Further, these articles retain their properties under various kinds of exposure including exposure to moisture.

As far as is known, this invention also makes possible the first satisfactory filament-reinforced resinous sheet reinforced with layers of collimated carbon filaments (such as the filaments prepared by high-temperature treatment of rayon fibers). These carbon filaments are quite porous and soak up resin when coated by conventional methods for making filament-reinforced sheeting, whereupon insufficient resin may be left to provide integrity and handleability for a useful sheet product. However, by application of a preformed film to previously coated collimated carbon filaments, as taught in this invention, a satisfactory sheet product is obtained.

Figure 2:
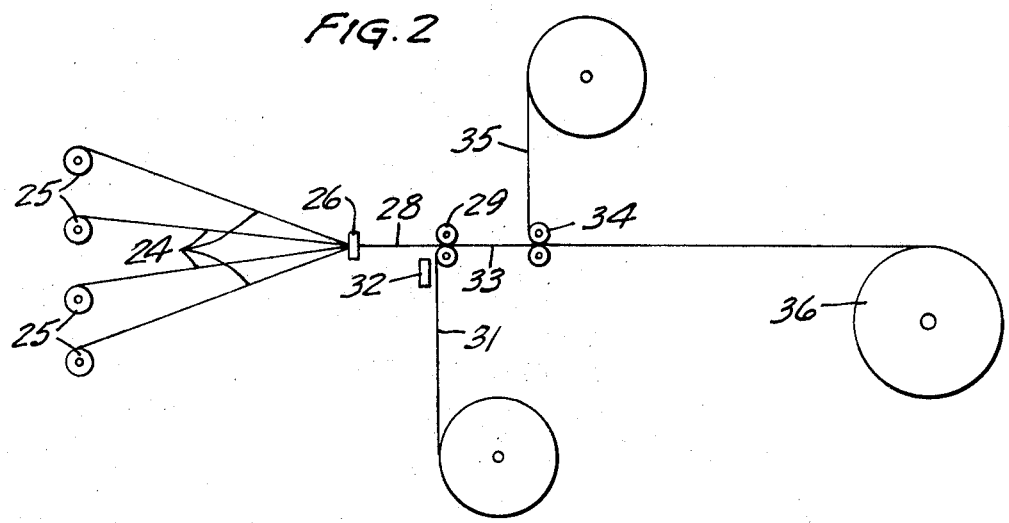
Figure 3:
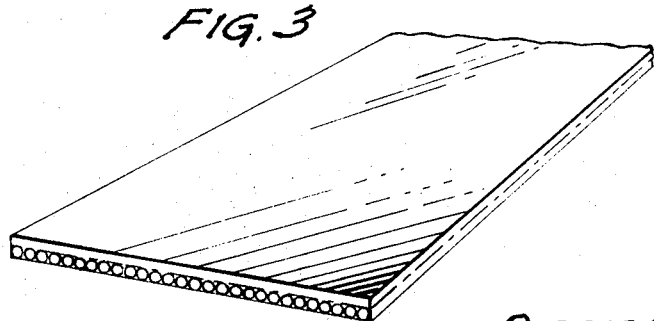

In the drawings, FIGURES 1 and 2 schematically illustrate apparatus and method for preparing filament-reinforced sheeting of the invention, while FIGURE 3 illustrates filament-reinforced sheeting of the invention in cross-section.

In the exemplary method shown in FIGURE 1, flexible high-strength reinforcing filaments or fibers 10, such as strands or yarns of monofilaments of glass or carbon, are unwound from an array of storage rolls 11. The filaments 10 are passed through a comb 12 to collimate and otherwise arrange them in shoulder-to-shoulder relation in a flate dense web 14. The web 14 is then passed over a roller 15 and into a dip tank 16 in which the filaments 10 are coated with a solution or melt of a heat-curable resin composition. Excess resin is removed from the coated web, as by passage through squeeze rolls 17, and the coated filaments are dried to form usually a handleable, integral, filament-reinforced resinous base sheet 18 in which the resin composition is a matrix between, around, and impregnated in the filaments. In the case of carbon filaments, which absorb a great deal of the resin composition, the base sheet 18 may be handleable at this point only with care.

Whether the filament-reinforced resinous base sheet 18 is wound and stored for a period of time or immediately brought to the next station, preparation of filament-reinforced sheeting of the invention by the typical method of FIGURE 1 is continued by adding a separate, exterior film 19 to the base sheet 18 to form the finished filament-reinforced resinous sheet product 20. In the method illustrated in FIGURE 1, the film 19 is a preformed film of heat-curable resin composition that is pressed with the base sheet 18 between rollers 21 and laminated to the base sheet. The completed product, illustrated in cross section in FIGURE 3, is then wound upon a storage roll 22. Instead of laminating a preformed film to the base sheet 18, an appropriate resin composition could be coated on the base sheet.

FIGURE 2 illustrates a method for preparing a somewhat different filament-reinforced sheeting of the invention. This sheeting uses fibers or filaments, such as large-diameter monofilaments of a material such as boron, each individually precoated with a resin composition; the precoat of resin composition is preferably between about 0.1 and 0.5 mil in thickness. Precoated fibers or filaments of reinforcement 24 are unwound from storage rolls 25 and passed through a comb 26 and collimated and arranged into a flat dense web 28. As illustrated in FIGURE 2, the web 28 of precoated filaments is then passed between squeeze rolls 29 where a preformed film 31 is laminated to the web 28; a heater 32 may be used to maintain the film 31 of resin composition in a somewhat tacky and flowable condition such that the individual precoated filaments 24 are pressed into the film 31. The integral filament-reinforced resinous sheet 33 that leaves the squeezing rolls 29 may be the finished product, and a liner 35 may be laminated to the top of the sheet 33 between squeeze rolls 34. On the other hand, depending on the amount of resin composition desired in the finished filament-reinforced resinous sheet product, or the thickness of the first film 31, a second preformed film of resin composition may be laminated to the top of the sheet 33, either by the squeeze rolls 29 or the squeeze rolls 34.

The heat-curable resin composition initially coated on the filaments (either by coating the web by the method of FIGURE 1 or by precoating the filaments individually) and the heat-curable resin composition of the exterior film must be compatible, but they need not be the same. In fact, it is sometimes advantageous that dissimilar resin compositions are used since they can then be specifically formulated to have the properties most required of them. For example, the resin composition of the exterior film can be formulated to have properties imparting high interlaminar peel strength to a molded article or structural member, while the resin composition initially coated on the fibers or filaments of reinforcement can be formulated to have properties imparting a high tensile and flexural strength and high flexural modulus of elasticity to the molded object.

Heat-curable resin compositions having the required properties for use in the exterior film include heat-curable resins that cure to high strength, and a modifying resin that increases the toughness of the composition. For example, resin compositions including epoxy resin and a modifying resin such as a carboxylated acrylonitrile-butadiene elastomer, a polyhydroxy ether resin, a polyvinyl formal resin, or an acrylonitrile-butadiene-styrene resin have been found quite useful. In some resin compositions contemplated as useful in the invention, the modifying resin has been preattached to an epoxy resin so as to be part of the epoxy resin molecule itself. Another useful class of heat-curable resin compositions of this invention comprise a heat-curable phenol-formaldehyde resin in combination with a modifying resin such as a carboxylated acrylonitrile-butadiene elastomer; these resin compositions are especially desirable for use with carbon fibers of reinforcement to provide a molding material from which objects may be molded and then charred for use as ablative structural members.

In general, resins or polymers useful as the modifying resin in this invention should have high molecular weight (above 10,000 or 20,000, for example) and should substantially deform when stressed beyond their yield point. While the modifying resins are often thermoplastic, they desirably have a functional group that is reactive with functional groups of the heat-curable resin, whereby the modifying resin becomes part of the cross-linked structure. The carboxyl groups of carboxylated acrylonitrile-butadiene elastomers or the hydroxyl group of polyhydroxy ethers or polyvinyl formal have been found to provide the desired functional groups.

The modifying resin imparts toughness while substantially increasing capability for elongation of the final cured product. In general, the modifying resin increases the amount that a product of the heat-curable resin composition elongates by about 50 percent, and preferably by 100 percent. On the other hand, the cured products made from the filament-reinforced sheeting of this invention must not excessively deform under low stress. Modifying resins should be included that balance in the final cured product, toughness with a high modulus of elasticity. In general, it has been found that the desired toughness of the molded product is imparted with modifying resins such as those described above included in at least about 5–10 parts by weight of the resin composition of the film. On the other hand, to obtain a satisfactory modulus of elasticity in the molded object, the resin composition of the film should generally not include more than about 50 parts by weight of the modifying resin, though some modifying resins, as described, may be used in excess of that amount. For the best results, the amount of modifying resin should be between about 20 and 40 parts by weight of the resin composition of the film.

The filament-reinforced resinous sheeting of this invention should contain between about 35 and 65 volume percent resin composition. To achieve the desired percentage of resin composition, the layer of reinforcing filaments is generally originally coated with a lesser amount of resin composition than would be used if such a coating was to complete the product. To obtain the best interlaminar strength, the film added to the coated intermediate filament-reinforced sheet is between about ½ and 4 mils, and preferably between about 1 and 3 mils, in thickness.

The invention is further illustrated by the following examples:

EXAMPLE 1

A web of collimated glass strands (such as Owens-Corning ECG 140's, #801 finish, which include 204 monofilaments that are each 0.00038 inch in diameter) in shoulder-to-shoulder relation was coated with the following molten resinous composition:

Parts by wt.
Cresol novolac epoxy resin (Kopox 737) _____ 100
Methylbicyclo (2.2.1) heptene-2,3-dicarboxylic anhydride isomers (Nadic methyl anhydride) _____ 47.4
Zinc salt of 2-ethylhexanoic acid and decyl diphenylphosphite (DBVIII of Argus Chemical Co.) ____ 2.9

The resulting filament-reinforced resinous base sheet comprised about 60 volume-percent glass and about 40 volume-percent resin composition.

Two films approximately 3 mils in thickness and having the following different resin compositions were then cast from an acetone solution:

| | Parts by Weight | |
|---|---|---|
| | Film A | Film B |
| Cresol novolac epoxy resin (Kopox 737) | 46.6 | 33.2 |
| Nadic Methyl Anhydride | 22.1 | 15.8 |
| Phenol salt of triamyl amine | 1.3 | 1.0 |
| Carboxylated acrylonitrile-butadiene elastomer (Hycar 1072; a high molecular weight elastomer comprising about 5% acrylic acid, 35% acrylonitrile, and 60% butadiene) | 30 | 50 |

Two sets of test panels were prepared by stacking in alternating fashion segments of filament-reinforced base sheet and film, each set of test panels including one of the two kinds of film. The stacks were pressed in a platen press under 75 pounds/square inch of pressure and heated for 30 minutes at 300° F., and then were post-cured four hours at 350° F. Two 4-ply (using four segments of filament-reinforced resinous sheet) panels and two 12-ply panels were prepared; the 12-ply panels were crossply panels.

Control test panels, both of the 4-ply and 12-ply kind, were also prepared without a layer of film between the segments of filament-reinforced resinous sheets for use in comparison with the above panels. The filament-reinforced resinous sheets for these control panels had been prepared as disclosed above, impregnating an identical web of glass strands with a resin composition including the epoxy resin, anhydride, and phenol salt described above in weight percentages of 66.5, 31.6, and 1.9, respectively; the resin composition comprised about 53 volume-percent of the sheet.

A woven glass cloth (Style No. 181) was adhered to one face of the 4-ply panels and an aluminum sheet bonded to the other face. One end of the outside filament-reinforced sheet bonded to the glass cloth was then lifted from the panel and peeled from the panel using the climbing drum test procedure of ASTM D 1781–62. The 12-ply panels were tested for flexural strength and flexural modulus using the ASTM D–790 test procedure. The following results were obtained:

|  | Control Panels | Panels using— | |
|---|---|---|---|
|  |  | Film A | Film B |
| Interlaminar peel strength (pounds/inch of width) | 7.2 | 15.4 | 22.8 |
| Flexural strength (1,000 pounds/square inch) | 203.1 | 153.0 | 113 |
| Flexural modulus (1,000,000 pounds/square inch) | 5.16 | 4.06 | 3.47 |

From the results of these and other tests, it has been found that between about 20 and 50 weight-percent of this elastomer should be included in the resin compositions of the exterior film of filament-reinforced sheeting of this invention, the most desirable amount being about 20–40 weight percent.

EXAMPLE 2

Two films of resin composition having the following formulations were cast in about 3-mil thicknesses from a methyl-ethyl-ketone solution:

|  | Parts by Weight | |
|---|---|---|
|  | Film A | Film B |
| Epoxy cresol novolac resin (Kopox 737) | 46.6 | 33.2 |
| Nadic Methyl Anhydride | 22.1 | 15.8 |
| Phenol salt of triamyl amine | 1.3 | 1.0 |
| Polyhydroxy ether formed from bisphenol A and epichlorohydrin and having an average molecular weight of 20,000–30,000, a specific gravity of 1.18, and a softening point of 212° F. (Union Carbide PRDA–8080) | 30 | 50 |

The results of tests on panels prepared and tested as in Example 1 were as follows:

|  | Control Panels | Panels using— | |
|---|---|---|---|
|  |  | Film A | Film B |
| Interlaminar peel strength (pounds/inch of width) | 7.2 | 13.6 | 16.9 |
| Flexural strength (1,000 pounds/square inch) | 203.1 | 165.7 | 153.0 |
| Flexural modulus (1,000,000 pounds/square inch) | 5.16 | 4.0 | 3.85 |

From the results of these and other tests, it has been found that more than about 20 weight-percent, up to about 50 weight-percent of the above polyhydroxy ether should be included in the resin compositions of the exterior film of filament-reinforced sheeting of the invention for the best results.

EXAMPLE 3

Two different kinds of film were cast in about a 3-mil thickness from an acetone-ethylene dichloride solution of the following resin compositions:

|  | Parts by Weight | |
|---|---|---|
|  | Film A | Film B |
| Epoxy cresol novolac resin (Kopox 737) | 59.8 | 46.6 |
| Nadic Methyl Anhydride | 28.4 | 22.1 |
| Phenol salt of triamyl amine | 1.7 | 1.3 |
| Polyvinyl formal (Formvar; having a molecular weight between about 16,000 and 20,000 and including 9.5–13 weight-percent acetate groups, 5–6.5 weight-percent hydroxy groups, and 82 weight-percent formal groups; and having an elongation at the yield point of 7 percent and at break of 50 percent, and having an apparent modulus of elasticity of 4.0–4.5 million pounds/square inch) | 10 | 30 |

The results of tests on panels prepared and tested as in Example 1 were as follows:

|  | Control Panels | Panels using— | |
|---|---|---|---|
|  |  | Film A | Film B |
| Interlaminar peel strength (pounds/inch of width) | 7.2 | 14.5 | 19.9 |
| Flexural strength | 203.1 | 157.8 | 158.7 |
| Flexural modulus (1,000,000 pounds/square inch) | 5.16 | 3.70 | 3.87 |

From the results of these and other tests, it has been found that between about 10 and 50 weight-percent of the above polyvinyl formal should be included in resin compositions of the exterior film of filament-reinforced sheeting of the invention for the best results, the most desirable amount being about 30–50 weight percent.

EXAMPLE 4

Carbon (more specifically, graphite) yarns, 0.030 inch in diameter and formed as the residue of rayon yarns charred at over 2,000° F., were formed into a layer at a density of 60 yarns/inch and coated in a dip tank with a phenol-formaldehyde resin that conformed to United States Military Specification MIL–R–9299. The resulting web comprised about 44 volume-percent resin. A 3-mil film was then cast from an isopropanol solution of the following resin composition:

Parts by wt.
Carboxylated acrylonitrile-butadiene rubber (Hycar-1072) _____ 20
Phenol-formaldehyde resin (as described above) ____ 80

This film was laminated to the carbon-filament-reinforced resinous base sheet described above. The resin composition of the resulting complete prepreg tape comprises between about 50 and 55 volume-percent of the tape. Panels were then molded as described above from this tape and tested with the following results:

Parts by wt.
Specific gravity _____ 1.42
Flexure strength, p.s.i. _____ 87,600
Flexure modulus, p.s.i. _____ $3.09 \times 10^6$
Tensile strength, p.s.i. _____ 67,400
Tensile modulus, p.s.i. _____ $3.46 \times 10^6$
Compression strength, p.s.i. _____ 56,300
Compression modulus, p.s.i. _____ $3.70 \times 10^6$

EXAMPLE 5

A filament-reinforced resinous base sheet was prepared by coating a flat dense layer of continuous filaments, viz., 150 ends per inch of "ECG 150–1/05 end, treatment 038" glass filaments, as in the procedure illustrated in FIGURE 1. The coating resin comprised a solvent-free blend of bisphenol-epichlorohydrin epoxy resin and boron trifluoride-monoethanolamine complex ($BF_3400$) curing agent heated to 200° F. to attain a flowable consistency. The coated layer of filaments was fed between squeeze rolls to remove excess resin, and then joined at a pressure roll to a low-adhesion paper liner; thereafter the web was passed through an oven at 250° F. for 10 minutes to provide a nontacky solvent-free reinforced resinous base sheet.

The exposed surface of this sheet was joined to a second liner that carried a one-mil thick dried film of a nylon-epoxy resin composition, and the pressure roll at which the liner was joined was maintained at 200° F. to fuse the film to the sheet. The nylon-epoxy resin composition had been prepared by first dissolving 45 parts by weight of methanol-soluble nylon (Zytel 61; an interpolyamide formed from hexamethylenediammonium adipate, hexamethylenediammonium sebacate and caprolactam) in a methanol-water mixture at 150° F. with constant agitation under total reflux for 2 hours until no particles of nylon could be seen in a sample of the solution. To this solution was added a solution of 55 parts of epoxy resin (DEN 438) and 15 parts of N,N-diallylmelamine curing agent in 13 parts of methyl ethyl ketone.

A number of sheets cut and removed from the liners were stacked together to provide a nylon-epoxy film at each interface and the stack cured in a heated platen press under 25 pounds per square inch at 300° F. for 30 minutes. The monolithic cured panel produced was characterized by superior resistance to edge delamination when sawed, sheared, punched, or drilled.

I claim:
1. Filament-reinforced resinous sheeting adapted to form laminated heat-cured resinous objects of high interlaminar strength comprising (A) a thin flexible layer of high-strength reinforcing filaments, (B) a heat-curable resin composition coated onto the filaments, and (C) a separate exterior film about ½ to 4 mils in thickness firmly attached on at least one side of the layer of coated filaments, said film comprising a heat-curable resin composition that includes (1) a high-strength heat-curable resin and (2) a modifying resin that substantially increases the capability for elongation of the film resin composition when cured, said modifying resin having a high molecular weight and exhibiting a substantial deformation when stressed beyond its yield point greater than that exhibited by the heat-curable resin, the modifying resin comprising no more than 50 parts by weight of the combination of heat-curable resin and modifying resin in the exterior film, and the total heat-curable resin composition in the sheeting comprising between about 35 and 65 volume percent of the sheeting.

2. The sheeting of claim 1 in which the layer of filaments comprises continuous glass fibers in nonwoven parallel lineally aligned relation.

3. The sheeting of claim 1 in which the layer of filaments comprises continuous carbon fibers.

4. The sheeting of claim 1 in which the layer of filaments comprises continuous parallel lineally aligned large-diameter boron monofilaments.

5. The sheeting of claim 1 in which the modifying resin carries a functional group through which the modifying resin may be linked to the heat-curable resin.

6. A method for forming filament-reinforced laminated heat-cured resinous objects of high interlaminar strength comprising
(1) assembling thin flexible layers of reinforcing filaments coated with a heat-curable resin composition in alternating superposed relation with ½ to 4-mil films of a heat-curable resin composition,
(a) said films of heat-curable resin composition including a heat-curable resin and a modifying resin that substantially increases the capability for elongation of the cured film resin composition, said modifying resin having a high molecular weight and exhibiting a substantial deformation when stressed beyond its yield point greater than that of the heat-curable resin, and
(b) the total heat-curable resin composition coated on the filaments and contained in the intermediate films comprising between about 35 and 65 volume percent of the assembly; and
(2) heating and pressing the assembly to mold it into a high-strength object.

References Cited
UNITED STATES PATENTS

| | | | |
|---|---|---|---|
| 3,409,497 | 11/1968 | Roseland | 161—170 X |
| 3,410,749 | 11/1968 | Chmiel | 161—92 |
| 3,414,460 | 12/1968 | Hassert et al. | 161—143 |
| 3,416,990 | 12/1968 | Robinson | 161—93 |
| 2,602,037 | 7/1952 | Nelb | 161—93 |
| 2,694,694 | 11/1954 | Greenlee | 161—185 X |
| 2,705,223 | 3/1955 | Renfrew et al. | 161—185 X |
| 2,712,001 | 6/1955 | Greenlee | 161—185 X |
| 2,897,841 | 8/1959 | Hul et al. | 161—142 X |
| 2,920,990 | 1/1960 | Been et al. | 161—185 X |
| 3,186,866 | 6/1965 | Claeys | 117—126 |
| 3,321,099 | 5/1967 | Carlyle et al. | 161—185 X |
| 3,323,962 | 6/1967 | Sprengling et al. | 161—185 X |
| 3,390,037 | 6/1968 | Christie | 161—185 X |
| 3,391,053 | 7/1968 | Kolb | 161—185 |

HAROLD ANSHER, Primary Examiner

U.S. Cl. X.R.

156—306, 313, 330; 161—185